United States Patent [19]
Utsumi et al.

[11] Patent Number: 4,736,323
[45] Date of Patent: * Apr. 5, 1988

[54] SIGNAL TRANSMISSION SYSTEM BETWEEN SIGNAL PROCESSOR AND IGNITOR

[75] Inventors: Hiroo Utsumi; Noboru Yamamoto, both of Kariya; Kazuhiro Iwata, Nagasaki, all of Japan

[73] Assignee: Nippondenso Co., Ltd., Kariya, Japan

[*] Notice: The portion of the term of this patent subsequent to Dec. 5, 2003 has been disclaimed.

[21] Appl. No.: 396,683

[22] Filed: Jul. 9, 1982

[30] Foreign Application Priority Data
Jul. 10, 1981 [JP] Japan .................. 56-107758

[51] Int. Cl.⁴ .................. F02P 5/16; F02P 9/00
[52] U.S. Cl. .................. 364/431.12; 123/425; 307/260
[58] Field of Search .................. 364/431.11, 431.12; 123/425, 427, 606, 643; 330/288; 307/260, 261

[56] References Cited
U.S. PATENT DOCUMENTS

| | | | |
|---|---|---|---|
| 4,307,691 | 12/1981 | Nagae et al. | 123/427 X |
| 4,382,429 | 5/1983 | Enoshima et al. | 123/427 X |
| 4,382,430 | 5/1983 | Iwasaki | 123/643 X |
| 4,409,937 | 10/1983 | Asano | 123/427 X |
| 4,430,624 | 2/1984 | Newton | 330/288 |

Primary Examiner—Felix D. Gruber
Attorney, Agent, or Firm—Cushman, Darby & Cushman

[57] ABSTRACT

A signal transmission system for transmitting, in particular, an ignition timing correction signal in an ignition timing control system for an internal combustion engine includes an ignitor for producing an ignition timing signal in response to an ignition signal from a distributor, and the ignition timing signal is further corrected by the ignition timing correction signal calculated in a computer based on engine operating conditions sensed by sensors. The computer includes a voltage-current converting circuit which converts the ignition timing correction signal in the form of a voltage signal into a current signal corresponding thereto and supplies the current signal to the ignitor through a signal line connecting between the computer and the ignitor. The ignitor includes a current-voltage converting circuit to convert the current signal from the computer into a voltage signal corresponding to the current signal which indicates the correction of the ignition timing.

3 Claims, 2 Drawing Sheets

SIGNAL TRANSMISSION SYSTEM BETWEEN SIGNAL PROCESSOR AND IGNITOR

BACKGROUND OF THE INVENTION

The present invention relates to a signal transmission system, and more in particular to a system for transmitting an ignition signal in which an ignition timing correction amount is computed from various sensor signals on the basis of a basic ignition timing determined by a pickup signal of a pickup contained in a distributor.

A block diagram of a conventional ignition timing control system is shown in FIG. 1. In FIG. 1, an ignitor 12 shapes the waveform of a pickup signal 21 produced from a distributor 11, thereby determining a basic ignition timing and an energization start timing of a coil 13. Further, the ignitor 12 determines an actual ignition timing on the basis of the basic ignition timing in accordance with retardation or advance data contained in an ignition timing correction voltage signal produced from a computer 14, and applies an ignition signal 23 indicating the energization start timing and the actual ignition timing to the coil 13 on the one hand and a basic ignition signal 24 indicating the basic ignition timing to the computer 14 on the other hand. Sensors 15 detect by means of vibration, sound, pressure or light, the engine operating conditions including engine speed, acceleration or deceleration, water temperature of the engine, knocking in the cylinders and crank position of the piston and produce sensor signals 25.

In response to the basic ignition signal 24 and various sensor signals 25, the computer 14 computes the ignition timing correction amount with respect to the basic ignition timing and supplies a voltage signal 22 corresponding to the correction amount to the ignitor 12. The coil 13 generates a high voltage at the ignition timing determined by the ignition signal 23 produced from the ignitor 12 thereby to ignite a spark plug (not shown). In the above-mentioned construction in which the ignition timing correction signal 22 to the ignitor 12 is produced in the form of a voltage signal corresponding to the correction amount, the disadvantage mentioned below results.

In the case where a signal line (designated also by 22) connecting the computer 14 to the ignitor 12 is so long that a line drop causes a potential difference between the ground potential of the ignitor 12 and the ground potential of the computer 14, the ignitor 12 reads a voltage value of the voltage signal 22 on the signal line 22 with reference to the ground potential of the ignitor 12 which is slightly different from that of the computer 14, and computes a correction value for the basic ignition timing even though the computer 14 produces a voltage value corresponding to the ignition timing correction amount on the basis of the ground potential of the computer 14 and applies it to the ignitor 12 through the signal line 22. As a result, the difference between the ground potential of the computer 14 and the ground potential of the ignitor 12 directly causes an error of the ignition timing, thereby making it impossible to accurately control the ignition timing.

SUMMARY OF THE INVENTION

The present invention has been developed in view of the above-mentioned disadvantage and the object thereof is to provide an ignition timing control system in which the ignition timing correction signal 22 is outputted from the computer 14 to the ignitor 12 in the form of a current signal corresponding to the correction amount represented by the ignition timing correction signal 22 thereby to reduce the ignition timing error caused by the potential difference between the ground potential of the computer 14 and the ground potential of the ignitor 12.

DESCRIPTION OF THE PREFERRED EMBODIMENT

Figure 2:
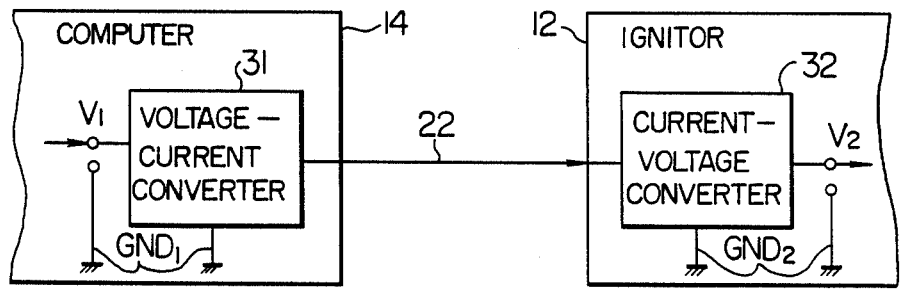
FIG. 2 shows an embodiment of an ignition timing control system of an internal combustion engine according to the present invention, illustrating the output of a computer and the input of an ignitor.

An embodiment of the ignition timing control system according to the present invention is shown in FIG. 2. A voltage-current converter circuit 31 is included in computer 14 and is supplied with a voltage value $V_1$ (produced by computer 14) corresponding to an ignition timing correction amount for basic ignition timing. The voltage-current converter circuit 31 produces a current signal 22 corresponding to the voltage $V_1$ measured with reference to a ground potential $GND_1$ of the computer 14. A current-voltage converter circuit 32 included in an ignitor 12, on the other hand, is supplied with the current signal 22 and produces a voltage $V_2$ with reference to a ground potential $GND_2$ of the ignitor 12, which ignitor 12 in turn uses the voltage $V_2$ as an ignition timing correction amount for the basic ignition timing.

Figure 1:
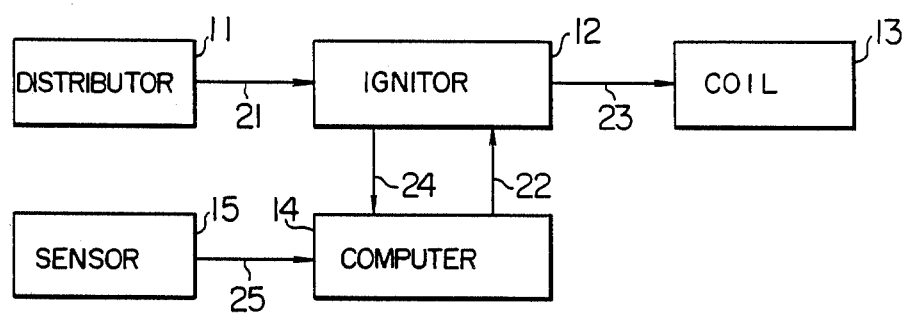
FIG. 1 is a diagram showing a configuration of a conventional ignition timing control system of an internal-combustion engine.
Figure 4:
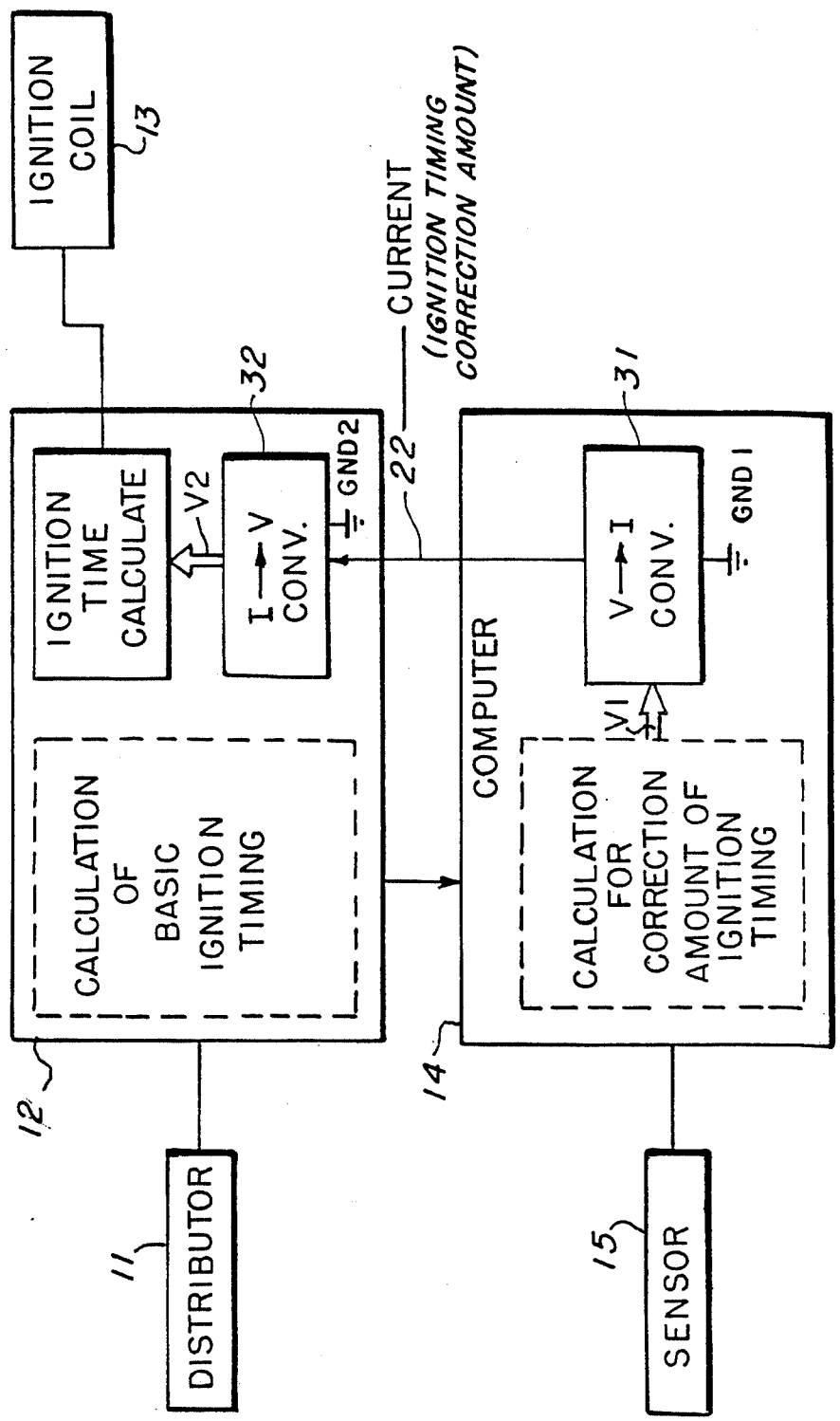
FIG. 4 is a self-explanatory exemplary embodiment of the present invention.

This incorporation of the FIG. 2 subject matter of the present invention into the Prior Art FIG. 1 is more explicity shown in FIG. 4. A current signal is carried via line 22 from the voltage-to-current converter 31 (contained with "computer" 14) to the current-to-voltage converter 32 (contained in "ignitor" 12). Calculation for the correction amount of the ignition timing is performed in "computer" 14, while calculation of the basic ingition timing is performed within "ignitor" 12.

Figure 3A:
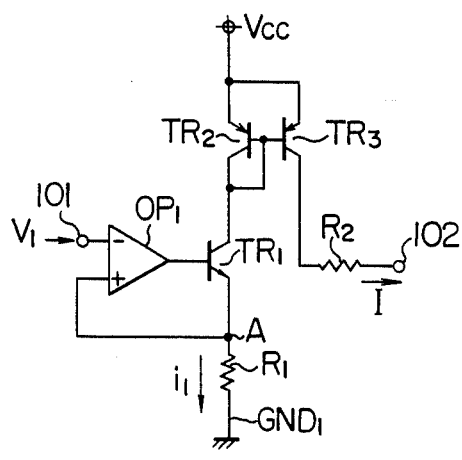
FIGS. 3a and 3b are specific electrical circuit diagrams showing the voltage-current converter circuit and the current-voltage converter circuit in FIG. 2.
Figure 3B:
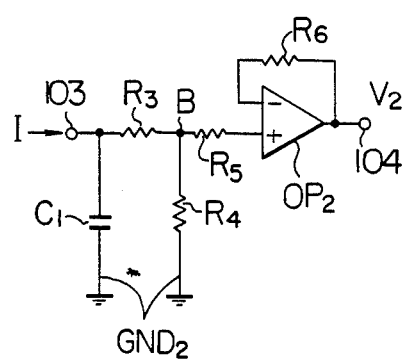

Specific circuit examples of the voltage-current converter circuit 31 and the current-voltage converter circuit 32 in FIG. 2 are shown in FIGS. 3a and 3b respectively.

In FIG. 3a, a terminal 101 is connected to the inverting terminal of an operational amplifier $OP_1$, the output terminal of which is connected to the base terminal of a transistor $TR_1$. The emitter terminal of the transistor $TR_1$ is connected through a resistor $R_1$ to a ground terminal $GND_1$ on the one hand and to the non-inverting terminal of the operational amplifier $OP_1$ on the other hand. The collector terminal of the transistor $TR_1$ is connected to the collector and base of a transistor $TR_2$ and to the base of a transistor $TR_3$ at the same time. The emitter of the transistor $TR_2$ and the emitter of the transistor $TR_3$ are connected to a power supply Vcc. The collector of the transistor $TR_3$ is connected to a terminal 102 through a resistor $R_2$.

In FIG. 3b, a terminal 103 is connected through a capacitor $C_1$ to a ground terminal $GND_2$ on the one hand and to an end of a resistor $R_3$ on the other hand. The other end of the resistor $R_3$ is connected to the ground terminal $GND_2$ through a resistor $R_4$ and to the non-inverting terminal of an operational amplifier $OP_2$ through a resistor $R_5$ at the same time. The inverting terminal of the operational amplifier $OP_2$ is connected to the output terminal of the operational amplifier $OP_2$ through a resistor $R_6$, and the output terminal of the operational amplifier $OP_2$ is connected to a terminal 104.

The operation of the circuits shown in FIGS. 3a and 3b will be described. When the voltage $V_1$ measured with reference to the ground potential $GND_1$ is applied to the terminal 101, the operational amplifier $OP_1$ turns on and off the transistor $TR_1$ so that the potential at a point A in FIG. 3a becomes equal to the voltage $V_1$. As a result, the magnitude of a current $i_l$ flowing through the resistor $R_1$ is proportional to the voltage at the point A and inversely proportional to the value of the resistor $R_1$. A current I of the same magnitude as the current $i_l$ which is proportional to the voltage at the point A, namely, the voltage $V_1$ is outputted at the terminal 102 through the resistor $R_2$ from a current mirror circuit including the transistors $TR_2$ and $TR_3$. As a result, the voltage $V_1$ applied to the terminal 101 with reference to the ground potential $GND_1$ is subjected to voltage-current conversion and outputted to the terminal 102 as the current I proportional to the voltage $V_1$.

In FIG. 3b, the current I applied to the terminal 103 flows through the resistors $R_3$ and $R_4$ to the ground terminal $GND_2$. Since the input impedance of the operational amplifier $OP_2$ is high, the current is prevented from flowing to the operational amplifier $OP_2$ through the resistor $R_5$. A voltage determined by the values of the current I, resistors $R_3$ and $R_4$ is generated at a point B with reference to the ground potential $GND_2$ and is outputted at the terminal 104 as a voltage $V_2$ through a buffer including the operational amplifier $OP_2$ and the resistor $R_6$. The capacitor $C_1$ is inserted for absorbing high-frequency noises. The current I applied to the terminal 103 is thus subjected to a current-voltage conversion and is outputted at the terminal 104 with reference to the ground potential $GND_2$ as the voltage $V_2$ proportional to the current I.

In this configuration, even when the ground potential $GND_1$ of the computer 14 is different from the ground potential $GND_2$ of the ignitor 12, the computer 14 converts the voltage value $V_1$ corresponding to the ignition timing correction amount into a current value based on the ground potential $GND_1$ of the computer 14 and delivers it to the ignitor 12 as a current signal 22. The ignitor 12, on the other hand, produces a voltage signal $V_2$ from the current signal 22 on the basis of the ground potential $GND_2$ of the ignitor 12 and uses this voltage signal $V_2$ as a correction amount of the basic ignition timing. The ignition timing correction amount is thus not affected by the difference in ground potential between the computer 14 and the ignitor 12, thereby attaining an accurate ignition timing control.

The aforementioned embodiment concerns an ignition system to which the present invention is applied. The present invention may be utilized in other devices such as a device for transmitting a signal for determining the fuel injection timing. The present invention is thus applicable to cases in which a processing circuit is separately arranged from drive means, or especially to various devices of an internal combustion engine.

What is claimed is:

1. A signal transmission system comprising:
a distributor for generating a pickup signal in synchronism with an internal combustion engine;
at least one sensor for producing detection signals based on operating characteristics of said internal combustion engine;
an ignitor for generating a basic ignition timing signal in response to said pickup signal; and
a processing unit for computing and applying to said ignitor an ignition timing correction signal on the basis of said detection signals from said at least one sensor and said basic ignition timing signal,
said processing unit converting said ignition timing correction signal from a voltage signal into a current signal, and
said ignitor reconverting said ignition timing correction signal from the current signal into a voltage signal and applying said reconverted voltage signal to an ignition coil.

2. A signal transmission system comprising:
a sensor for detecting an operating condition of an internal combustion engine from at least one operating parameter of said internal combustion engine;
a processing circuit for processing a signal from said sensor and generating a voltage signal corresponding to the operating condition of said internal combustion engine;
a voltage-current converter circuit for converting the voltage signal from said processing circuit into a current signal;
a current-voltage converter circuit located at a position separate from said voltage-current converter circuit for converting the current signal into a voltage signal; and
drive means driven by the voltage signal produced from said current-voltage converter circuit, said voltage signal generated by said processing circuit being accurately transmitted to said drive means regardless of a difference in ground potential between said processing circuit and said drive means.

3. A signal transmission system comprising:
a distributor for generating a pickup signal in synchronism with rotation of an internal combustion engine;
an ignitor for generating a basic ignition timing signal in response to said pickup signal;
a sensor for detecting an operating condition of said internal combustion engine and for generating a detection signal representative thereof;
a processing unit for computing and applying to said ignitor an ignition timing correction signal on the basis of said detection signal from said sensor and said basic ignition timing signa from said ignitor;
a signal line connecting said processing unit and said ignition, respective ground potentials of said processing unit and said ignitor being different from each other;
a voltage-current converting circuit included in said processing unit for converting said ignition timing correction signal into a current signal and transmitting said current signal on said signal line to said ignitor; and
a current-voltage converting circuit included in said ignitor for converting said current signal into a voltage signal corresponding thereto,
said ignitor calculating an ignition timing using said voltage signal as a correction amount to said basic ignition timing and producing an ignition timing which is applied to an ignition coil of said internal combustion engine.

* * * * *